(12) United States Patent
Yasu

(10) Patent No.: US 10,633,020 B2
(45) Date of Patent: Apr. 28, 2020

(54) TIE ROD END

(71) Applicant: HONDA MOTOR CO., LTD., Tokyo (JP)

(72) Inventor: Takashi Yasu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 12 days.

(21) Appl. No.: 15/769,129

(22) PCT Filed: Oct. 21, 2016

(86) PCT No.: PCT/JP2016/081371
§ 371 (c)(1),
(2) Date: Apr. 18, 2018

(87) PCT Pub. No.: WO2017/069277
PCT Pub. Date: Apr. 27, 2017

(65) Prior Publication Data
US 2018/0297635 A1 Oct. 18, 2018

(30) Foreign Application Priority Data

Oct. 23, 2015 (JP) .................................. 2015-208702

(51) Int. Cl.
*B62D 6/00* (2006.01)
*B62D 7/20* (2006.01)
(Continued)

(52) U.S. Cl.
CPC .................. *B62D 7/20* (2013.01); *B21K 1/12* (2013.01); *B62D 7/08* (2013.01)

(58) Field of Classification Search
CPC ............... B21K 1/12; B62D 7/20; B62D 7/08
(Continued)

(56) References Cited

U.S. PATENT DOCUMENTS 5,765,844 A * 6/1998 Wood ........................ B62D 7/20
280/771
6,196,563 B1 † 3/2001 Haycraft
(Continued)

FOREIGN PATENT DOCUMENTS

CN 103963566 A † 8/2014
JP 2004-210063 A † 7/2004
(Continued)

OTHER PUBLICATIONS

Japanese Notice of Opposition dated Apr. 11, 2019, 14 pages.
(Continued)

*Primary Examiner* — Toan C To
(74) *Attorney, Agent, or Firm* — Rankin, Hill & Clark LLP

(57) ABSTRACT

A tie rod end includes a body portion having a curved portion and extending in a rod shape, an engaging portion with a tie rod provided at one end of the body portion, and a connecting portion with a knuckle arm provided at the other end of the body portion, and constitutes a part of a vehicle steering apparatus used for steering a vehicle. The body portion made of an aluminum warm-forged material is provided so that an outer curved portion is oriented toward a front of the vehicle when attached to the vehicle. Dimension in a vehicle height direction of the body portion is larger at an inner curved portion than at the outer curved portion. It is possible to obtain the tie rod end capable of securing sufficient rigidity against stress concentration inside the curved portion.

1 Claim, 7 Drawing Sheets

(51) Int. Cl.
 B21K 1/12 (2006.01)
 B62D 7/08 (2006.01)
(58) Field of Classification Search
 USPC .......................... 280/93.51, 93.511, 93.512
 See application file for complete search history.

(56) References Cited

U.S. PATENT DOCUMENTS

| | | | | |
|---|---|---|---|---|
| 7,547,028 | B1* | 6/2009 | Blaszynski | B62D 7/20 280/89.12 |
| 2005/0017472 | A1* | 1/2005 | Kondo | B60G 7/008 280/93.513 |
| 2006/0201735 | A1* | 9/2006 | Williams | B62D 3/12 180/428 |
| 2008/0197593 | A1* | 8/2008 | Byrne | B62D 7/20 280/86.757 |
| 2015/0175200 | A1* | 6/2015 | Seibert | B62D 7/20 280/93.51 |
| 2019/0061814 | A1* | 2/2019 | Saiki | B21J 5/02 |

FOREIGN PATENT DOCUMENTS

| | | | |
|---|---|---|---|
| JP | 2012-223793 A | † | 11/2012 |
| JP | 2013-067317 A | | 4/2013 |
| JP | 2013-208986 A | | 10/2013 |
| JP | 2015-182101 A | † | 10/2015 |
| WO | 2011028155 A1 | | 3/2011 |

OTHER PUBLICATIONS

International Search Report by ISA/JP published on Apr. 27, 2017, on PCT/JP2016/081371 (1 page).
Written Opinion by ISA/JP published on Apr. 27, 2017, on PCT/JP2016/081371 (3 pages).

\* cited by examiner
† cited by third party

TIE ROD END

TECHNICAL FIELD

The present invention relates to a tie rod end constituting a part of a vehicle steering apparatus used for steering a vehicle.

BACKGROUND ART

The vehicle such as an automobile is provided with the vehicle steering apparatus used for steering the vehicle. A part made of a metallic material called a tie rod end is attached to an end of a tie rod constituting a part of the vehicle steering apparatus. The tie rod end is a functional part used for transmitting a steering force of a steering wheel to wheels by connecting the tie rod and a knuckle arm.

For example, Patent Document 1 discloses a tie rod end having a body portion having a curved portion and extending in a rod shape and a tubular socket portion for accommodating a ball portion of a ball stud at one end of the body portion.

CITATION LIST

Patent Literature

Patent Document 1: Japanese Patent Application Publication No. 2012-223793

SUMMARY OF INVENTION

Technical Problem

In the tie rod end having a curved portion as shown in Patent Document 1, two deformation modes occur in a vehicle longitudinal direction (direction in which the tie rod end is offset) and in a vehicle height direction, and in particular, stress tends to concentrate on an inner side of the curved portion. Therefore, there remains room for improvement in that sufficient rigidity is secured against stress concentration inside the curved portion.

The present invention has been made in view of the above circumstances, and an object of the present invention is to provide a tie rod end capable of securing sufficient rigidity against stress concentration inside the curved portion.

Solution to Problem

In order to solve the above problems, a tie rod end according to the present invention includes a body portion having a curved portion and extending in a rod shape, an engaging portion with a tie rod provided at one end of the body portion, and a connecting portion with a knuckle arm provided at the other end of the body portion, and constitutes a part of a vehicle steering apparatus used for steering a vehicle. The body portion is made of an aluminum warm-forged material, the body portion is provided so that an outer side of the curved portion is oriented toward a front of the vehicle when attached to the vehicle, and dimension in a vehicle height direction of the body portion is larger at an inner side of the curved portion than at the outer side of the curved portion.

According to the study of the inventors of the present invention, in the tie rod end having the curved portion on the body portion and the outside of the curved portion facing the front side of the vehicle, when attached to the vehicle, two deformation modes in the vehicle longitudinal direction (direction in which the tie rod end is offset) and in the vehicle height direction are generated, and it has been found that stress concentration tends to easily occur at the inner side of the curved portion (rear side of the vehicle) as compared with the outer side of the curved portion (front side of the vehicle).

Therefore, in the tie rod end (1) according to the present invention, the body portion is made of the aluminum warm-forged material, and when attached to the vehicle, the tie rod end is configured to ensure a cross-section spreading in the vehicle longitudinal direction against an external force in the vehicle longitudinal direction (direction in which the tie rod end is offset) while increasing a cross-sectional area in the vicinity of a center line (line connecting a center point of a connecting member assembled to the tie rod end and a center point of a ball joint to be incorporated between a rack shaft and the tie rod) on which stress concentration tends to occur against an external force in the vehicle height direction. Thus, the tie rod end is configured such that the dimension in the vehicle height direction of the body portion is larger at the inner side of the curved portion than at the outer side of the curved portion, thereby efficiently securing rigidity against either deformation mode.

According to the tie rod end (1) of the present invention, since the dimension in the vehicle height direction of the body portion is larger at the inner side of the curved portion than at the outer side of the curved portion, it is possible to secure sufficient rigidity against stress concentration inside the curved portion. It is also possible to expect a secondary effect of obtaining the tie rod end having excellent aerodynamic characteristics. Further, since the body portion is made of the aluminum warm-forged material, it is possible to obtain the tie rod end which is light in weight and excellent in surface hardness.

Advantageous Effects of Invention

According to the present invention, it is possible to obtain a tie rod end capable of securing sufficient rigidity against stress concentration inside the curved portion.

DESCRIPTION OF EMBODIMENTS

Figure 1:
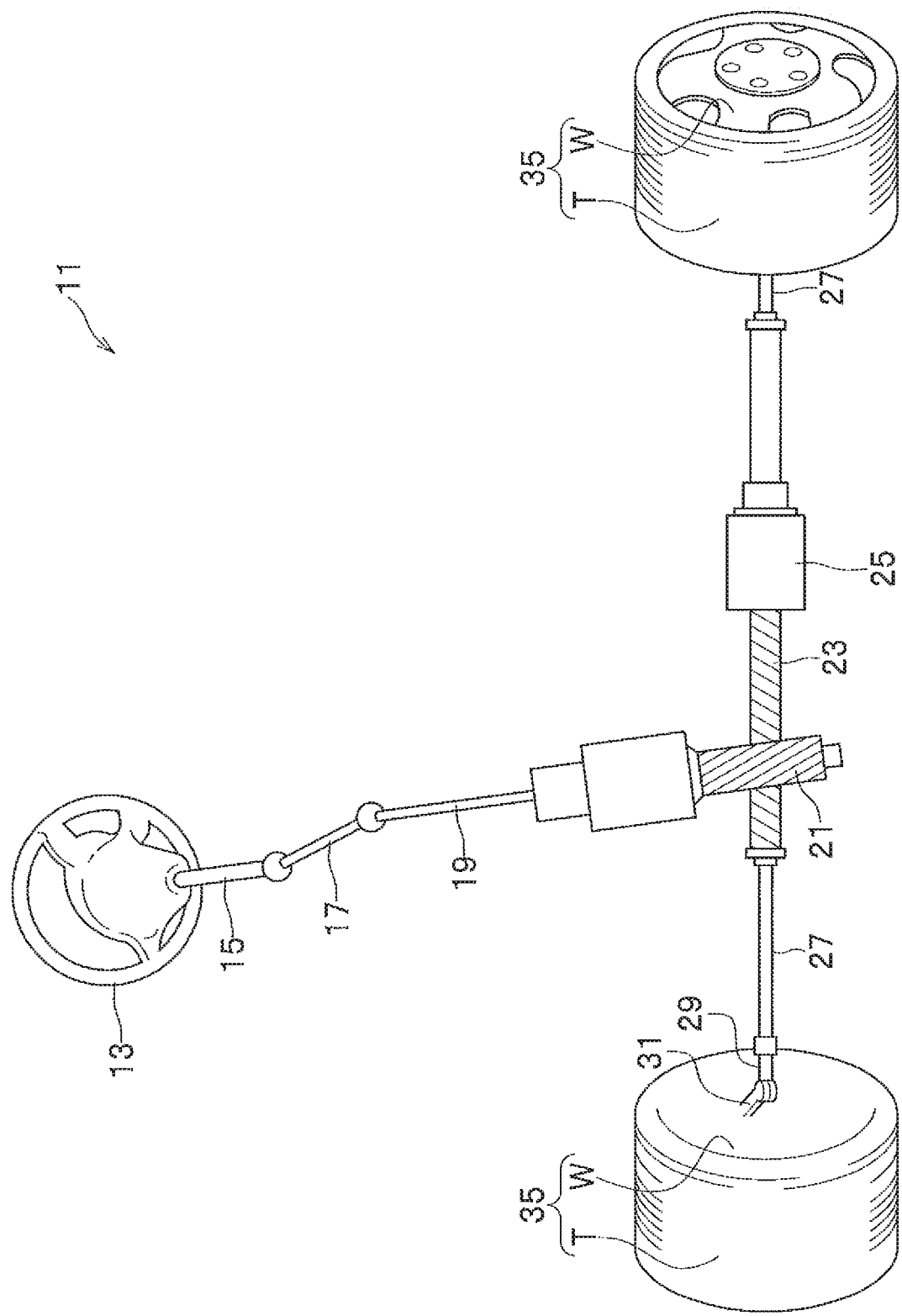
FIG. 1 is an explanatory diagram showing a configuration of a vehicle steering apparatus to which a tie rod end according to an embodiment of the present invention is attached.

A tie rod end according to an embodiment of the present invention will be described in detail with reference to the drawings below. Note that in principle common reference numerals are denoted to members having common functions or members having functions corresponding to each other in the following drawings. Further, for convenience of description, size and shape of the members may be schematically represented by being deformed or exaggerated.

[Configuration of Vehicle Steering Apparatus 11 to Which Tie Rod End 29 According to the Present Invention is Attached]

Figure 2:
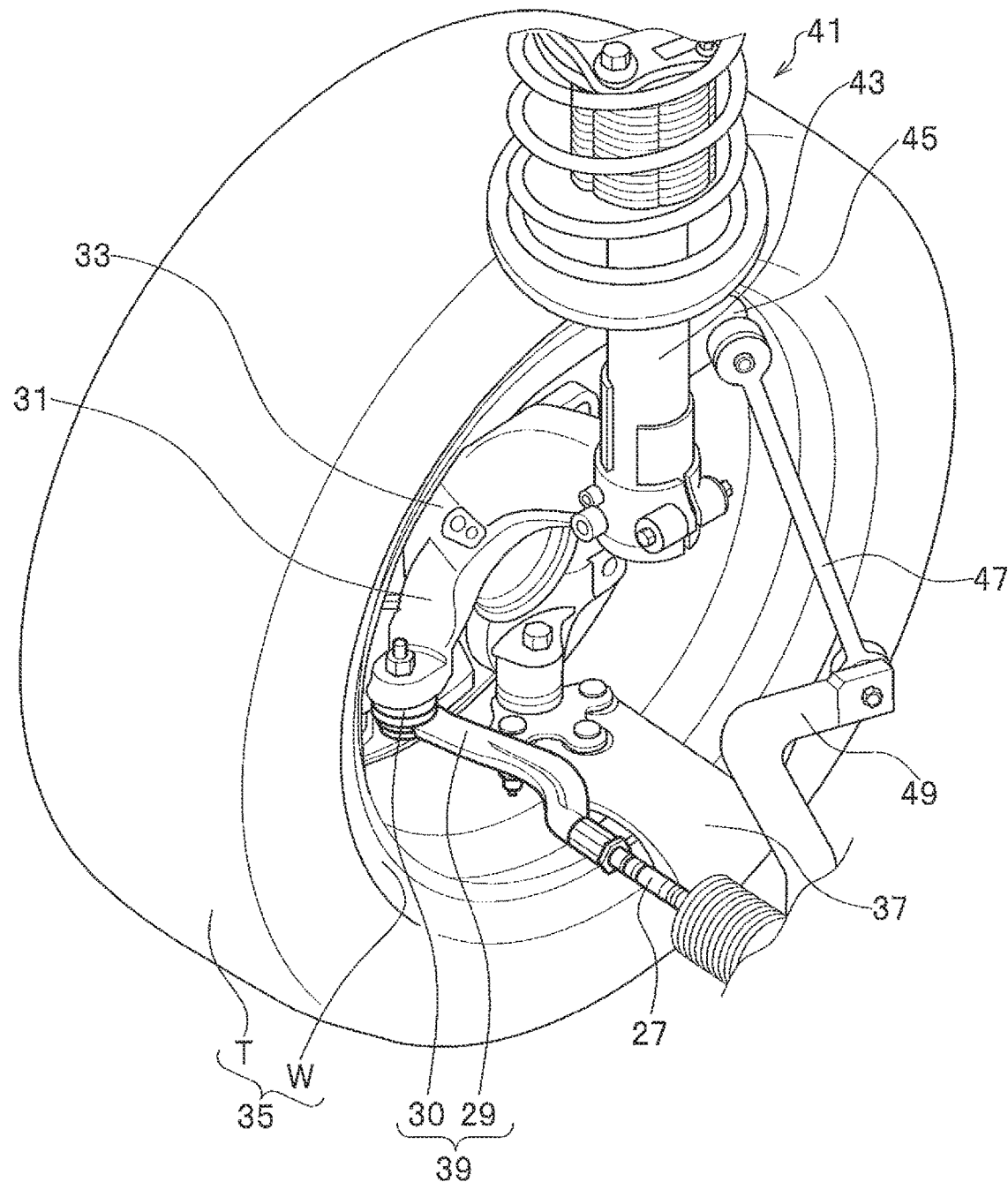
FIG. 2 is an explanatory diagram showing a configuration of a main portion and a peripheral portion of the vehicle steering apparatus.

A configuration of a vehicle steering apparatus 11 to which a tie rod end 29 according to an embodiment of the present invention is attached will be described with reference to FIGS. 1 and 2. FIG. 1 is an explanatory diagram showing the configuration of the vehicle steering apparatus 11 to which the tie rod end 29 according to the embodiment of the present invention is attached. FIG. 2 is an explanatory view showing a configuration of a main portion and a peripheral portion of the vehicle steering apparatus 11.

As shown in FIG. 1, the vehicle steering apparatus 11 includes a steering wheel 13, a steering shaft 15, a connecting shaft 17 having universal joints at both ends thereof, a steered shaft 19, a pinion shaft 21, a rack shaft 23, a steering assist motor 25, a tie rod 27 and a tie rod end 29.

The steering wheel 13 is a member which is operated when a driver intends to change a traveling direction of a vehicle (not shown) in a desired direction. One end of the steering shaft 15 is coupled to a center of the steering wheel 13. The steered shaft 19 is connected to the other end of the steering shaft 15 via the connecting shaft 17 having universal joints at both ends thereof. The pinion shaft 21 is coupled to the steered shaft 19. The rack shaft 23 meshes with the pinion shaft 21. The rack shaft 23 operates to reciprocate in a vehicle width direction (an axial direction of the rack shaft 23) in accordance with rotation of the pinion shaft 21. That is, the pinion shaft 21 and the rack shaft 23 constitute a rack-and-pinion mechanism.

The vehicle steering apparatus 11 is configured as an electric power steering apparatus. The vehicle steering apparatus 11 operates to reduce a steering force of the steering wheel 13 by the driver by reciprocating the rack shaft 23 in the vehicle width direction by assist torque of the steering assist motor 25.

As shown in FIG. 1, ends of the tie rods 27 are respectively connected to both ends of the rack shaft 23 via ball joints (not shown). Ends of the tie rod ends 29 (engaging portions 55; see FIG. 3A) are respectively rigidly coupled to the other ends of the tie rods 27. Knuckle arms 31 are respectively connected to the other ends (connecting portions 57; see FIG. 3A) of the tie rod end 29 via connecting members 30 (see FIG. 2) such as ball joints.

As shown in FIG. 2, the knuckle arm 31 is integrally formed with a knuckle body 33. A wheel W is rotatably supported by the knuckle body 33 via a hub bearing (not shown). The wheel W and a tire T constitute a steered wheel 35. Thus, the steered wheel 35 is steered when the driver manually operates the steering wheel 13.

As shown in FIG. 2, the knuckle body 33 is connected to a subframe (not shown) via a lower arm 37. Further, a cylinder 43 of a shock absorber 41 is rigidly coupled to the knuckle body 33. A stabilizer 49 is connected to a stabilizer bracket 45 provided on the cylinder 43 via a stabilizer link 47. The knuckle body 33, the lower arm 37 and the shock absorber 41 constitute a MacPherson strut suspension.

[Configuration of Tie Rod End 29 According to Embodiment of the Present Invention]

Figure 3A:
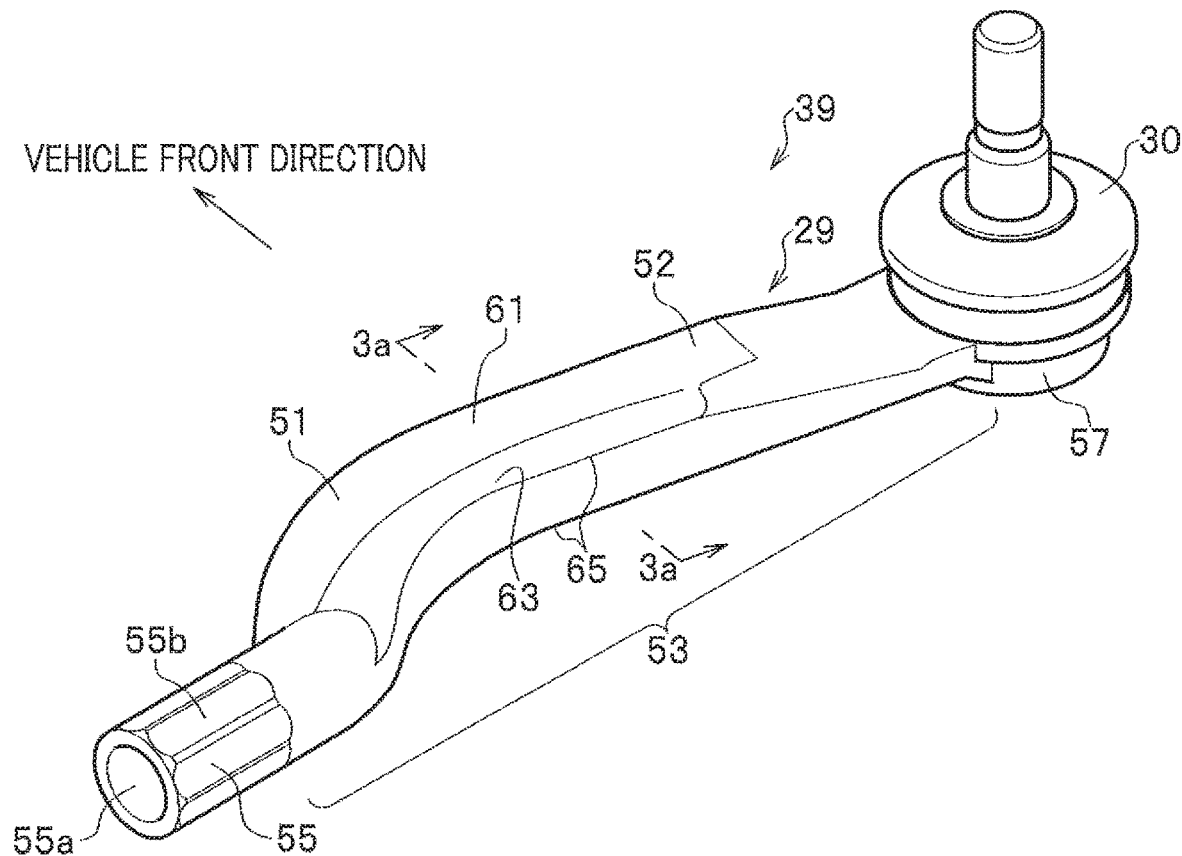
FIG. 3A is a perspective view of a tie rod end assembly in which a connecting member is assembled to the tie rod end according to the embodiment of the present invention.
Figure 3B:
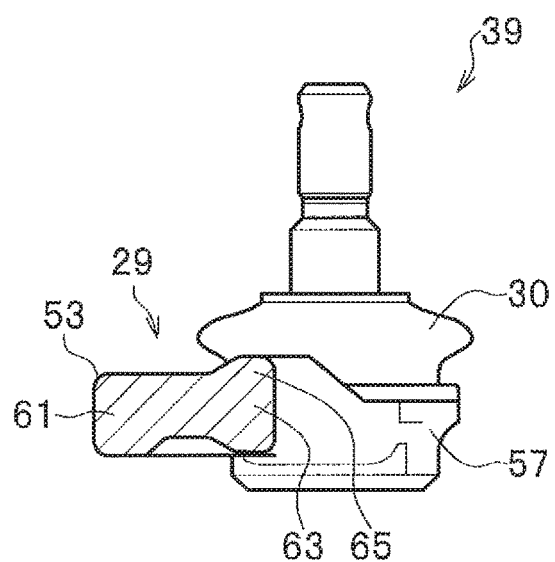
FIG. 3B is a vertical cross-sectional view of the tie rod end assembly taken along an arrow 3a-3a shown in FIG. 3A.
Figure 4A:
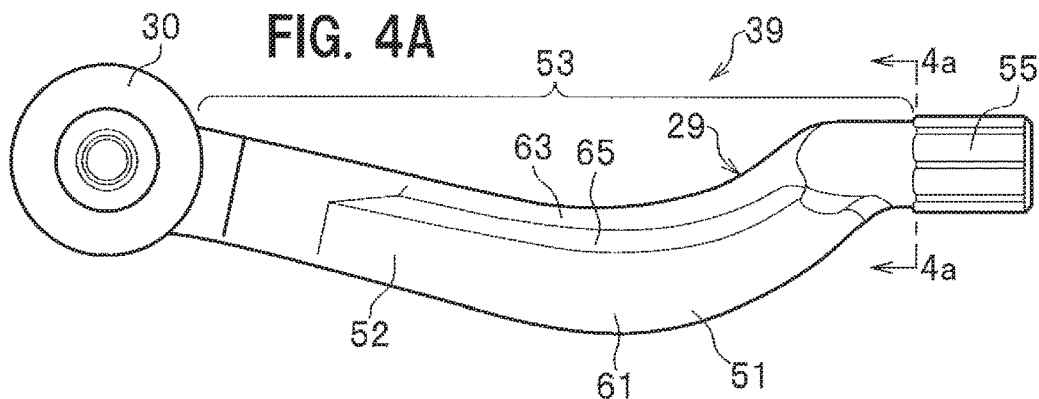
FIG. 4A is a front view of the tie rod end assembly.
Figure 4B:
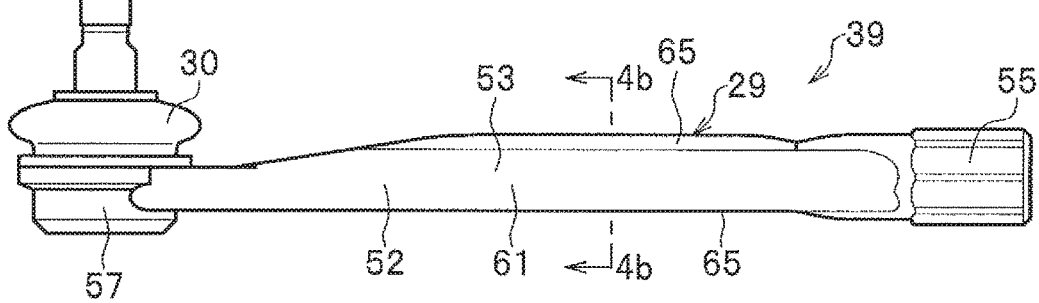
FIG. 4B is a side view of the tie rod end assembly.
Figure 4C:
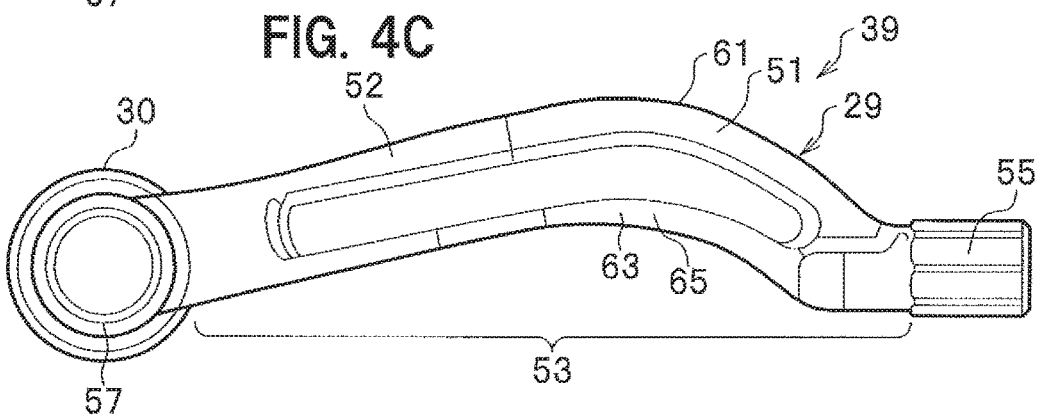
FIG. 4C is a rear view of the tie rod end assembly.
Figure 5A:
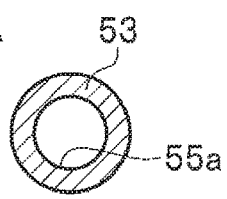
FIG. 5A is a vertical cross-sectional view of the tie rod end assembly taken along an arrow 4a-4a shown in FIG. 4A.
Figure 5B:
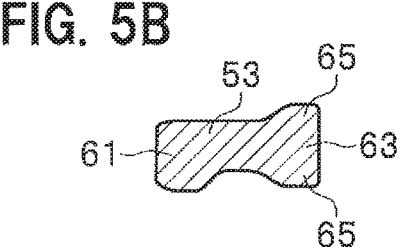
FIG. 5B is a vertical cross-sectional view of the tie rod end assembly taken along an arrow 4b-4b shown in FIG. 4B.

Next, a configuration of the tie rod end 29 according to the embodiment of the present invention will be described with reference to FIGS. 3A, 3B, 4A to 4C, 5A and 5B. FIG. 3A is a perspective view of a tie rod end assembly 39 in which the connecting member 30 is assembled to the tie rod end 29 according to the embodiment of the present invention. FIG. 3B is a vertical cross-sectional view of the tie rod end assembly 39 taken along an arrow 3a-3a shown in FIG. 3A. FIG. 4A is a front view of the tie rod end assembly 39. FIG. 4B is a side view of the tie rod end assembly 39. FIG. 4C is a rear view of the tie rod end assembly 39. FIG. 5A is a vertical cross-sectional view of the tie rod end assembly 39 taken along an arrow 4a-4a shown in FIG. 4A. FIG. 5B is a vertical cross-sectional view of the tie rod end assembly 39 taken along an arrow 4b-4b shown in FIG. 4B.

The tie rod end 29 according to the embodiment of the present invention is integrally formed of an aluminum warm-forged material. A method of manufacturing the tie rod end 29 will be described in detail below. As shown in FIGS. 3A, 4A to 4C, the tie rod end 29 includes a body portion 53 having a curved portion 51, an engaging portion 55 (with the tie rod 27) provided at one end of the body portion 53, and a connecting portion 57 (with the knuckle arm 31) provided at the other end of the body portion 53.

As shown in FIGS. 3A and 5A, the engaging portion 55 of the tie rod end 29 has a female threaded portion 55a. The female threaded portion 55a is a portion for coupling the tie rod end 29 to the tie rod 27 and is engaged with a male threaded portion (not shown) provided on an end of the tie rod 27. For example, a hexagonal tool fitting portion 55b is formed on an outer surface of the engaging portion 55. The tool fitting portion 55b is a portion to which a fastening tool such as a wrench used for screwing the tie rod end 29 to the end of the tie rod 27 is fitted. The tie rod end assembly 39 is formed by assembling the connecting member 30 such as a ball joint to the connecting portion 57 of the tie rod end 29.

As shown in FIGS. 3A, 4A to 4C, the body portion 53 includes the curved portion 51 and a rod-shaped portion 52. The curved portion 51 is provided to avoid interference (contact) of the tie rod end 29 with an object such as the wheel W (see FIG. 2) even with the steering wheel 13 turned to a right or left limit position, when the tie rod end 29 is attached to the vehicle.

As shown in FIGS. 2 and 3A, the tie rod end 29 is disposed such that an outer curved portion 61, which is an outer side (a convex side) of the curved portion 51, is oriented toward a front of the vehicle. As shown in FIGS. 3A, 4A and 4C, the outer curved portion 61 is provided with a rib 65 extending along the outer curved portion 61. That is, as shown in FIGS. 3B and 5B, in the tie rod end 29 according to the embodiment of the present invention, when attached to the vehicle, dimension of the curved portion 51 in a vehicle height direction of the body portion 53 is larger at an inner curved portion 63, which is an inner side of the curved portion, than at the outer curved portion 61. Stress concentration tends to occur near a line connecting a center point of a connecting member (ball joint) 30 assembled to the tie rod end 29 and a center point of a ball joint to be incorporated between the rack shaft 23 and the tie rod 27. Since the inner curved portion 63 exists in a stress concentration portion described above, it is intended to reinforce the stress concentration portion (inner curved portion 63). Thus, it is possible to obtain the tie rod end 29 capable of securing sufficient rigidity against stress concentration.

[Configuration of Tie Rod End 29A According to Modification]

Figure 6A:
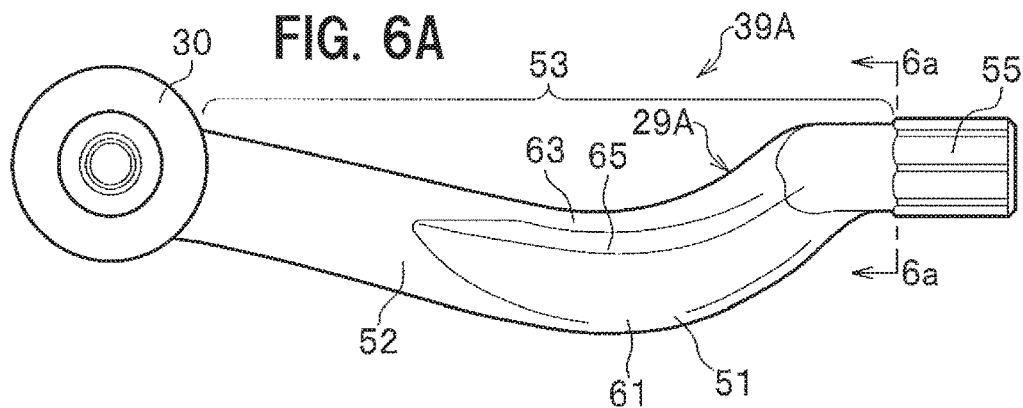
FIG. 6A is a front view of the tie rod end assembly according to a modification.
Figure 6B:
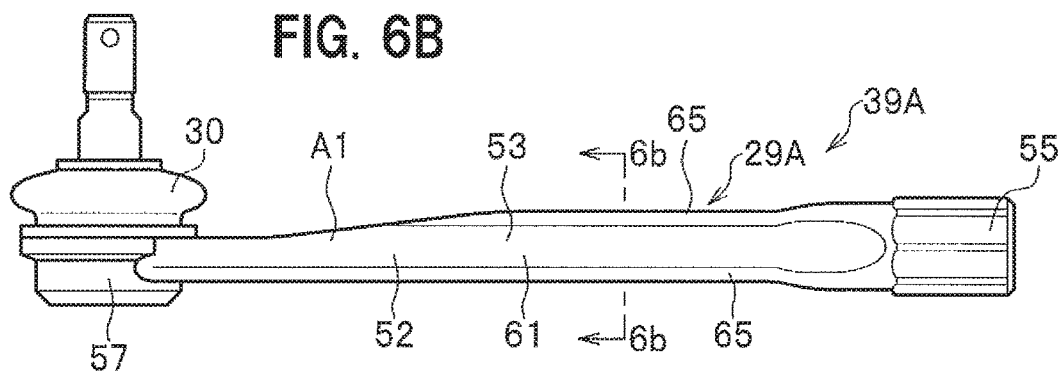
FIG. 6B is a side view of the tie rod end assembly according to the modification.
Figure 6C:
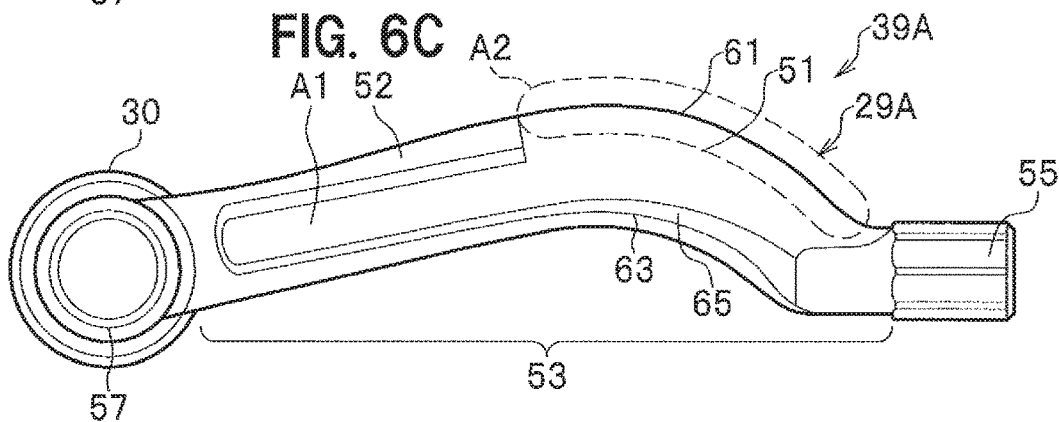
FIG. 6C is a rear view of the tie rod end assembly according to the modification.
Figure 7A:
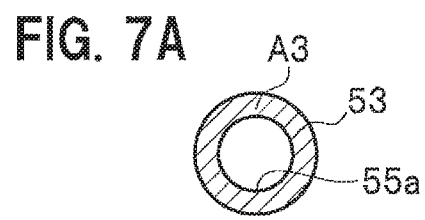
FIG. 7A is a vertical cross-sectional view of the tie rod end assembly according to the modification taken along an arrow 6a-6a shown in FIG. 6A.
Figure 7B:
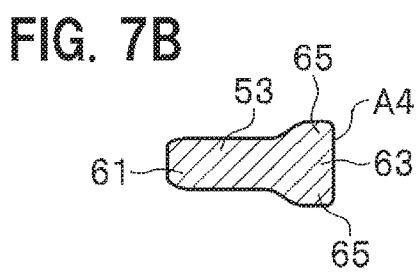
FIG. 7B is a vertical cross-sectional view of the tie rod end assembly according to the modification taken along an arrow 6b-6b shown in FIG. 6B.

Next, a configuration of the tie rod end 29A according to a modification will be described with reference to FIGS. 6A to 6C, 7A and 7B. FIG. 6A is a front view of a tie rod end assembly 39A according to the modification. FIG. 6B is a side view of the tie rod end assembly 39A according to the modification. FIG. 6C is a rear view of the tie rod end assembly 39A according to the modification. FIG. 7A is a vertical cross-sectional view of the tie rod end assembly 39A according to the modification taken along an arrow 6a-6a shown in FIG. 6A. FIG. 7B is a vertical cross-sectional view of the tie rod end assembly 39A according to the modification taken along an arrow 6b-6b shown in FIG. 6B.

The tie rod end 29 (see FIGS. 4A to 4C, 5A and 5 B) according to the embodiment of the present invention and the tie rod end 29A (see FIGS. 6A to 6 C, 7 A and 7 B) according to the modification are different in their structure in the following four points. A first difference is that in the tie rod end 29A according to the modification, a dimension in the vehicle height direction of the body portion 53 indicated by a reference numeral "A1" in FIGS. 6B and 6C is formed slightly smaller than that of the tie rod end 29 according to the embodiment of the present invention. The second difference is that the rib 65 provided to extend along the outer curved portion 61 of the tie rod end 29 according to the embodiment of the present invention is formed small in the tie rod end 29A according to the modification (see reference numeral "A2" in FIG. 6C). The third difference is that in the tie rod end 29A according to the modification, an external dimension of the body portion 53 indicated by reference character "A3" in FIG. 7A is formed slightly smaller than that of a corresponding portion of the tie rod end 29 according to the embodiment of the present invention. The fourth difference is that in the tie rod end 29A according to the modification, a dimension in the vehicle height direction of the inner curved portion 63 indicated by reference numeral "A4" in FIG. 7B is formed slightly smaller than that of a corresponding portion of the tie rod end 29 according to the embodiment of the present invention.

(Method of Manufacturing Tie Rod End 29)

Figure 8:
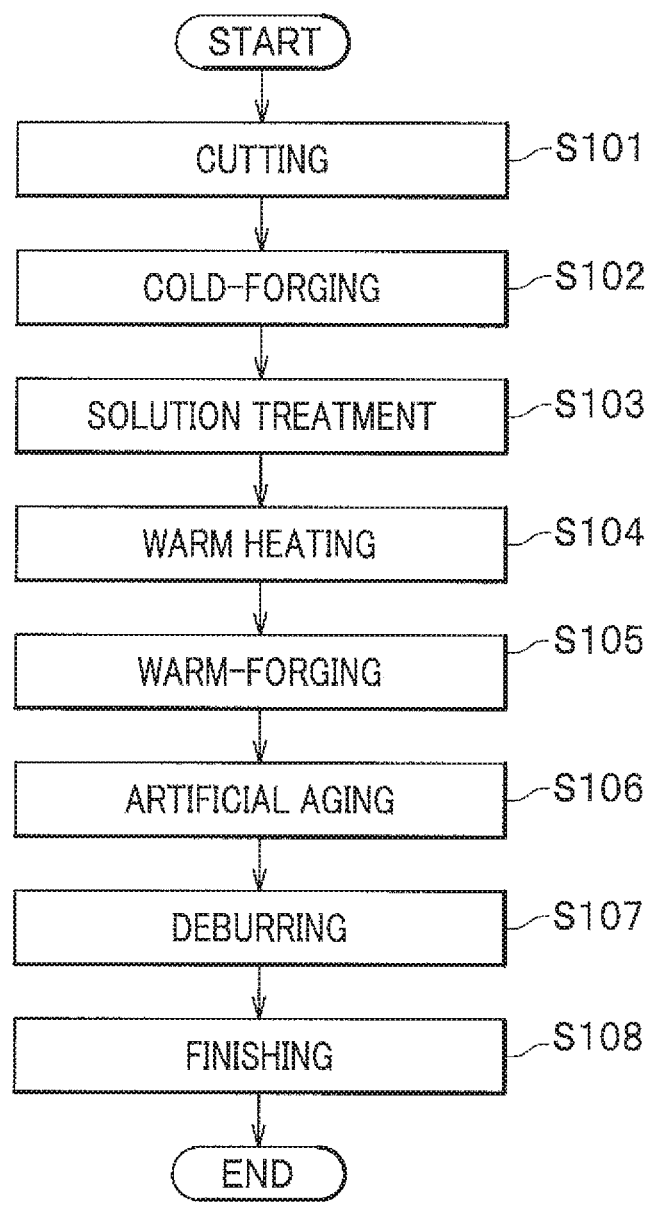
FIG. 8 is a process chart showing a method of manufacturing the tie rod end according to the embodiment of the present invention.

Next, a method of manufacturing the tie rod end 29 configured as described above will be described with reference to FIGS. 8, 9A to 9D. FIG. 8 is a process chart showing a method of manufacturing the tie rod end 29 according to the embodiment of the present invention. In the method of manufacturing the tie rod end 29, FIG. 9A schematically shows a workpiece immediately after cutting, FIG. 9B schematically shows the workpiece immediately after cold-forging (preforming), FIG. 9C schematically shows the workpiece immediately after warm-forging, and FIG. 9D schematically shows the workpiece immediately after deburring.

As shown in FIG. 8, the method of manufacturing the tie rod end 29 includes at least a warm-forging step (S105) of forming a workpiece 110 by warm-forging, and an artificial aging step (S106) of artificially preliminarily aging the workpiece 110 after warm-forging so that strength of a forged product is increased and the product does not change over time under a vehicle use environment or the like. The workpiece 110 is made of, for example, an aluminum alloy.

<Cutting Step: S101>

Figure 9A:
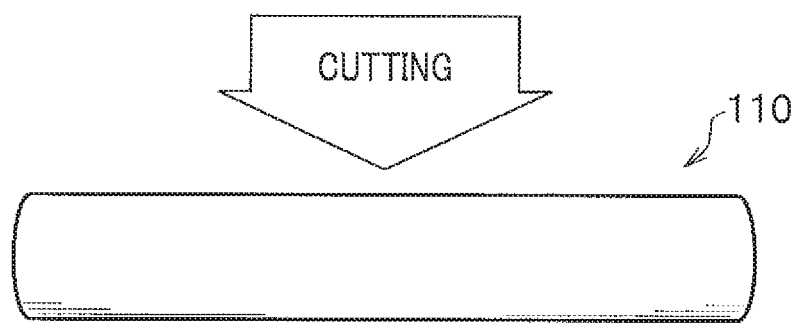
FIG. 9A is a diagram schematically showing a workpiece immediately after a cutting step in the method of manufacturing the tie rod end.
Figure 9B:
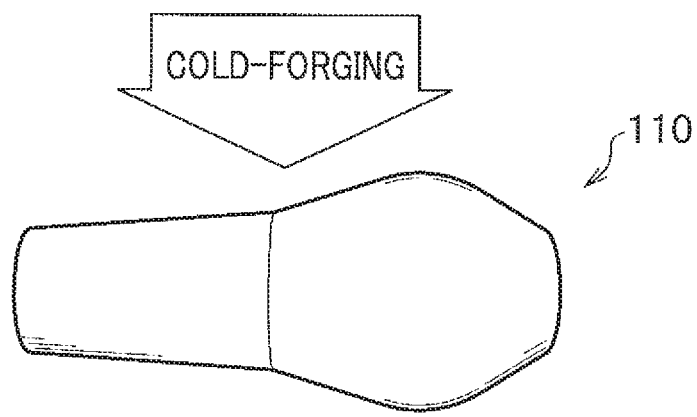
FIG. 9B is a view schematically showing a workpiece immediately after a cold-forging step in the method of manufacturing the tie rod end.
Figure 9C:
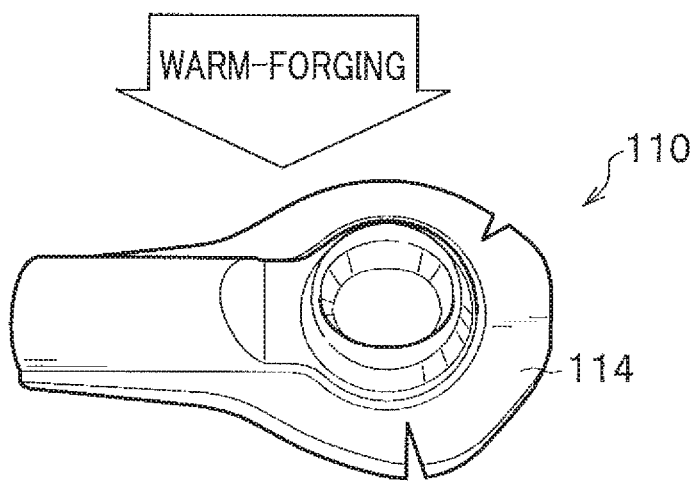
FIG. 9C is a view schematically showing a workpiece immediately after a warm-forging step in the method of manufacturing the tie rod end.
Figure 9D:
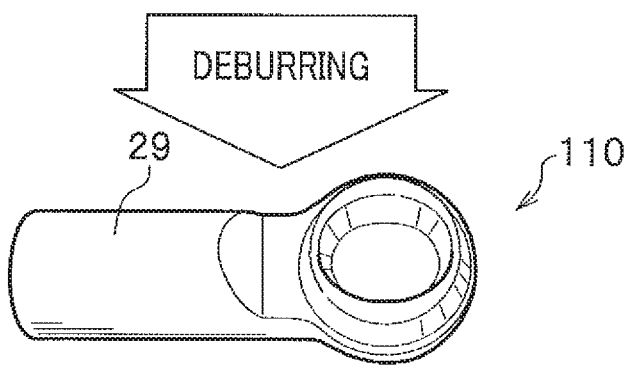
FIG. 9D is a view schematically showing a workpiece immediately after a deburring step in the method of manufacturing the tie rod end.

In Step S101 shown in FIG. 8, the workpiece 110 of an appropriate length is cut out from a columnar material made of an aluminum alloy (see FIG. 9A).

<Cold Forging Step: S102>

In Step S102, the workpiece 110 cut out is preformed by cold-forging (see FIG. 9B). Cold-forging means to forge the workpiece 110 at a temperature equal to or lower than a recrystallization temperature of the aluminum alloy and under low temperature (for example, at room temperature which is about 25° C. or lower).

<Solution Treatment Step: S103>

In Step S103, the workpiece 110 after cold-forging is subjected to solution treatment. Specifically, the workpiece 110 is heated to a solution treatment temperature (for example, about 540° C.) by using a suitable furnace, so that an alloy component is solid-solved in the workpiece 110 to facilitate aging precipitation and distortion due to cold-forging is eliminated.

<Warm Heating Step: S104>

In Step S104, the work piece 110 after the solution treatment is heated to a warm temperature for warm-forging. The warm heating temperature is set to be equal to or higher than normal temperature (about 25° C.) and equal to or lower than the recrystallization temperature. Specifically, in the present embodiment, since the workpiece 110 is made of an aluminum alloy, the warm heating temperature is set to, for example, about 100° C. to the recrystallization temperature or less.

<Warm-forging Step: S105>

In Step S105, the workpiece 110 heated to the warm temperature (recrystallization temperature or lower) is warm-forged (see FIG. 9C).

In the warm-forging, equivalent plastic strain of the workpiece 110 in a forging direction (compression direction) is set to 0.1 to 2.5 as a normal range.

This is because tensile strength of the workpiece 110 after manufacture decreases when the equivalent plastic strain is higher than 2.5 which is an upper limit value of the normal range. This is because a part of dislocation structure formed by forging is cellularized (recrystallization process) when the equivalent plastic strain is higher than 2.5 which is an upper limit value of the normal range.

Here, the equivalent plastic strain is preferably in a range of 0.1 to 2.1, and more preferably in the range of 0.4 to 2.1. This is because the tensile strength remarkably increases in this range.

As the equivalent plastic strain increases, dislocation density in the workpiece 110 gradually increases and the tensile strength also gradually increases. Further, as the equivalent plastic strain increases, elongation (%) of the workpiece 110 after manufacture tends to decrease. However, as the elongation decreases, toughness of the workpiece 110 decreases and the workpiece 110 is brittle. A range of tensile strength of a general aluminum alloy hot-forged product is about 285 to 385 MPa. In this manufacturing method, even when the equivalent plastic strain is about 0.1, the workpiece 110 has a tensile strength of about an upper limit value in hot-forging of the general aluminum alloy.

<Artificial Aging Step; S106>

In Step S106, the workpiece 110 after warm-forging is artificially aged. Specifically, the workpiece 110 is artificially aged in advance at a predetermined artificial aging temperature for a predetermined artificial aging time in order to increase the strength and to prevent surface hardness of the product (tie rod end 29) from changing over time while using the tie rod end 29 as a manufactured product incorporated into the vehicle.

The predetermined artificial aging temperature is set equal to or higher than a use environment temperature to which the manufactured product (tie rod end 29) is exposed. Thus, it is possible to prevent the surface hardness of the product (tie rod end 29) from changing over time while using the product incorporated into the vehicle. The predetermined artificial aging temperature is, for example, set to 150 to 200° C. The predetermined artificial aging time is determined by a preliminary test or the like and is set as short as possible within a range where the surface hardness of the manufactured product does not substantially change over time.

<Deburring (Trimming) Step: S107>

In Step S107, the workpiece 110 after artificial aging is deburred (trimmed) (see FIG. 9D). Specifically, a bur 114 of the workpiece 110 formed by warm-forging is removed.

<Finishing Step: S108>

In Step S108, the workpiece 110 after deburring is subjected to finishing processing. Specifically, for example, a surface of the workpiece 110 is polished and cleaned.

According to the method of manufacturing the tie rod end 29 described above, since the workpiece 110 is artificially aged after warm-forging, it is possible to increase the surface hardness of the product (tie rod end 29) and to maintain a stable surface hardness. It should be noted that the tie rod end 29A according to the modification may be manufactured by applying mutatis mutandis the method of manufacturing the tie rod end 29 according to the embodiment.

[Operational Effect of Tie Rod Ends 29, 29A According to Embodiments (Including Modification) of the Present Invention]

Next, operational effect of the tie rod ends 29, 29A according to the embodiments (including the modification) of the present invention will be described. The tie rod ends 29, 29A of the embodiments (including the modification) of the present invention includes the body portion 53 having the curved portion 51, the engaging portion 55 (with the tie rod 27) provided at one end of the body portion 53, and the connecting portion 57 (with the knuckle arm 31) provided at the other end of the body portion 53. The tie rod ends 29, 29A constitute a part of the vehicle steering apparatus 11 used for steering the vehicle. The body portion 53 made of aluminum warm-forging material is provided so that the outer curved portion 61 which is the outer side of the curved portion 51 is oriented toward a front of the vehicle when attached to the vehicle. The dimension of the body portion 53 in the vehicle height direction is larger at the inner curved portion 63 which is the inner side of the curved portion 51 than at the outer curved portion 61 which is the outer side of the curved portion 51.

With the tie rod ends 29, 29A according to the embodiment (including the modification) of the present invention, since the dimension of the body portion 53 in the vehicle height direction is larger at the inner side of the curved portion 51 (at the inner curved portion 63) than at the outer side of the curved portion 51 (at the outer curved portion 61), it is possible to secure sufficient rigidity against stress concentration inside the curved portion 51. It is also possible to expect a secondary effect of obtaining the tie rod ends 29, 29A having excellent aerodynamic characteristics. Further, since the tie rod ends 29, 29A according to the embodiment (including the modification) of the present invention are integrally molded with the aluminum warm-forged material using the method of manufacturing the tie rod end 29 (aluminum warm-forging technology), it is possible to obtain the tie rod ends 29, 29A which are light in weight and excellent in surface hardness. Particularly, by the method of manufacturing the tie rod end 29 (aluminum warm-forging technology), a portion having a small cross-sectional thickness has higher structural strength since its compression allowance is larger. In short, since the surface hardness of the front side of the vehicle (outer curved portion 61) can be made larger, it is possible to dramatically improve durability against flying stones or the like from the front of the vehicle.

[Other Embodiments]

The above-described embodiment shows an example of embodying the present invention. Therefore, the technical scope of the present invention should not be interpreted limitedly by these. This is because the present invention can be implemented in various forms without departing from the spirits and scope of the present invention.

For example, in description according to the embodiment of the present invention, the configuration where the assist torque of the steering assist motor 25 is given to the rack shaft 23 has been exemplified, but the present invention is not limited to this example. For example, a configuration may be adopted in which the assist torque of the steering assist motor 25 is given to the steering shaft 15, or a configuration may be adopted in which the assist torque of the steering assist motor 25 is given to the pinion shaft 21.

Further, in the description according to the embodiment of the present invention, the McPherson strut suspension has been exemplified, but the present invention is not limited to this example. For example, any one of a swing arm type, a double wishbone type, and a multi-link type may be adopted as the suspension.

Furthermore, in the description according to the embodiment of the present invention, an example where the tie rod end 29 is made of an aluminum alloy has been described, but the present invention is not limited to this example. The tie rod end 29 may be made of other kinds of metal.

REFERENCE SIGNS LIST

11: vehicle steering apparatus
27: tie rod
29: tie rod end according to embodiment
29A: tie rod end according to modification
31: knuckle arm
51: curved portion
53: body portion
55: engaged portion
57: connecting portion

The invention claimed is:

1. A tie rod end comprising:
a body portion having a curved portion and extending in a rod shape;
an engaging portion with a tie rod provided at one end of the body portion; and
a connecting portion with a knuckle arm provided at the other end of the body portion,
the tie rod end constituting a part of a vehicle steering apparatus used for steering a vehicle, wherein
the body portion is made of an aluminum warm-forged material,
the body portion is provided so that an outer side of the curved portion is oriented toward a front of the vehicle when attached to the vehicle, and a dimension in a vehicle height direction of the body portion is larger at an inner side of the curved portion than at the outer side of the curved portion, and is larger at the inner side of the curved portion than at a central portion connecting the inner side and the outer side of the curved portion, and
the dimension in the vehicle height direction of the body portion is larger at the outer side of the curved portion than at the central portion connecting the inner side and the outer side of the curved portion.

* * * * *